US009790786B2

(12) United States Patent
Croux et al.

(10) Patent No.: US 9,790,786 B2
(45) Date of Patent: Oct. 17, 2017

(54) BACKBONE NETWORK ARCHITECTURE AND NETWORK MANAGEMENT SCHEME FOR DOWNHOLE WIRELESS COMMUNICATIONS SYSTEM

(71) Applicant: SCHLUMBERGER TECHNOLOGY CORPORATION, Sugar Land, TX (US)

(72) Inventors: Arnaud Croux, Boston, MA (US); Stephane Vannuffelen, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/171,700

(22) Filed: Jun. 2, 2016

(65) Prior Publication Data

US 2016/0356152 A1 Dec. 8, 2016

(30) Foreign Application Priority Data

Jun. 5, 2015 (EP) .................................... 15290150

(51) Int. Cl.
*E21B 47/14* (2006.01)
*E21B 47/16* (2006.01)
(Continued)

(52) U.S. Cl.
CPC .............. *E21B 47/14* (2013.01); *E21B 47/16* (2013.01); *G08C 23/02* (2013.01); *H04B 11/00* (2013.01); *H04W 40/12* (2013.01)

(58) Field of Classification Search
CPC .................................. G08C 23/02; E21B 47/14
(Continued)

(56) References Cited

U.S. PATENT DOCUMENTS 6,628,636 B1 * 9/2003 Young ................... H04W 74/04
370/337
6,633,236 B2 10/2003 Vinegar et al.
(Continued)

FOREIGN PATENT DOCUMENTS

WO 0029717 5/2000
WO 2010069623 A1 6/2010
WO 2012131601 A1 10/2012

OTHER PUBLICATIONS

The Partial European Search Report issued in the related EP Application 15290150.0, mailed on Nov. 30, 2015 (7 pages).
(Continued)

*Primary Examiner* — Ojiako Nwugo
(74) *Attorney, Agent, or Firm* — Cameron R. Sneddon; Diana Sangalli

(57) ABSTRACT

A network management system for a wireless communications network adaptively selects wireless modems to use in communicating messages between a control system and downhole equipment. The wireless modems are selected based on a monitored signal to noise ratio. The network management system may be centralized within the network or within a surface control system or can be decentralized so that a plurality of the wireless modems can adaptively determine routing in the network. The network management systems can be used in conjunction with a backbone network architecture to achieve further efficiencies in network throughput.

18 Claims, 3 Drawing Sheets

(51) Int. Cl.
*H04B 11/00* (2006.01)
*H04W 40/12* (2009.01)
*G08C 23/02* (2006.01)

(58) Field of Classification Search
USPC ............................ 367/81; 340/853.1–855.4
See application file for complete search history.

(56) References Cited

U.S. PATENT DOCUMENTS

| | | | |
|---|---|---|---|
| 8,605,548 B2 | 12/2013 | Froelich | |
| 9,107,137 B1* | 8/2015 | Zawodniok | H04W 40/02 |
| 2004/0233855 A1* | 11/2004 | Gutierrez | H04L 45/00 |
| | | | 370/252 |
| 2004/0262008 A1* | 12/2004 | Deans | E21B 41/0007 |
| | | | 166/339 |
| 2006/0231466 A1* | 10/2006 | Nuber | B01J 8/0055 |
| | | | 209/11 |
| 2008/0056149 A1* | 3/2008 | Madhavan | H04W 74/08 |
| | | | 370/252 |
| 2008/0180273 A1 | 7/2008 | Kyle et al. | |
| 2008/0253228 A1 | 10/2008 | Camwell et al. | |
| 2009/0177404 A1* | 7/2009 | Hartmann | E21B 47/00 |
| | | | 702/9 |
| 2012/0128371 A1* | 5/2012 | Einicke | H04B 10/807 |
| | | | 398/141 |
| 2012/0249338 A1 | 10/2012 | Merino | |
| 2013/0028167 A1* | 1/2013 | Wen | H04W 40/06 |
| | | | 370/315 |
| 2013/0278432 A1 | 10/2013 | Shashoua et al. | |
| 2014/0087651 A1* | 3/2014 | Heo | H04B 7/14 |
| | | | 455/7 |
| 2014/0269188 A1* | 9/2014 | van Zelm | E21B 47/12 |
| | | | 367/81 |
| 2014/0320296 A1* | 10/2014 | Thurber | G08B 21/14 |
| | | | 340/632 |

OTHER PUBLICATIONS

The extended European Search Report issued in the related EP Application 15290150.0, mailed on Mar. 24, 2016 (12 pages).

\* cited by examiner

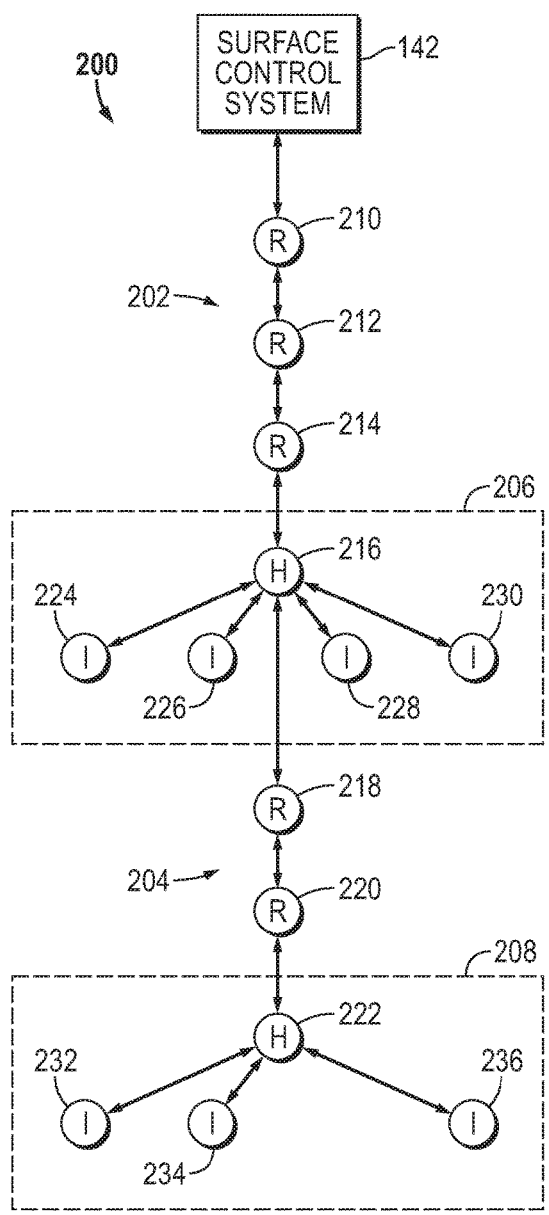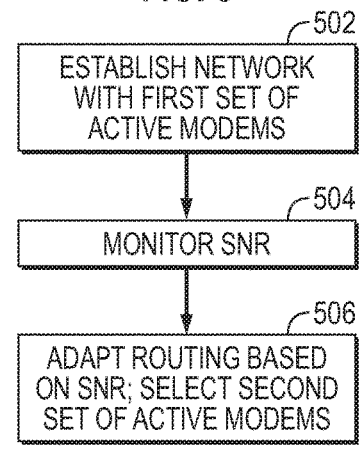

BACKBONE NETWORK ARCHITECTURE AND NETWORK MANAGEMENT SCHEME FOR DOWNHOLE WIRELESS COMMUNICATIONS SYSTEM

BACKGROUND

Hydrocarbon fluids, including oil and natural gas, can be obtained from a subterranean geologic formation, referred to as a reservoir, by drilling a wellbore that penetrates the formation. Once a wellbore is drilled, various well completion components are installed to enable and control the production of fluids from the reservoir. Data representative of various downhole parameters, such as downhole pressure and temperature, are often monitored and communicated to the surface during operations before, during and after completion of the well, such as during drilling, perforating, fracturing and well testing operations. In addition, control information often is communicated from the surface to various downhole components to enable, control or modify the downhole operations.

Accurate and reliable communications between the surface and downhole components during operations can be difficult. Wired, or wireline, communication systems can be used in which electrical or optical signals are transmitted via a cable. However, the cable used to transmit the communications generally has complex connections at pipe joints and to traverse certain downhole components, such as packers. In addition, the use of a wireline tool is an invasive technique which can interrupt production or affect other operations being performed in the wellbore. Thus, wireless communication systems can be used to overcome these issues.

In a wireless system, information is exchanged between downhole components and surface systems using acoustic or electromagnetic transmission mediums. As an example, a network of acoustic devices can be deployed downhole that uses the tubing as the medium for transmitting information acoustically. To ensure that communications from the devices reach the surfaces, an acoustic network is generally arranged as a series of repeaters. That is, communications from devices furthest from the surface are received and passed on by neighboring devices that are closer to the surface. Likewise, communications from the surface that are directed to the furthest removed devices are received and passed on by intermediate devices. Because of this series arrangement where the communication path traverses multiple devices that receive, process and retransmit messages, round trip communication times can be lengthy, which can have a detrimental impact on the throughput of the network.

SUMMARY

A method of communicating with downhole equipment in a borehole is disclosed. Wireless signals are communicated to exchange messages between a surface control system and downhole equipment to control performance of a downhole operation. The messages are exchanged using a first set of active wireless devices that are provided along a tubing in the borehole. An indicator of quality of the wireless signals on the first wireless communications path is monitored and, based on the indicator, a second set of active wireless devices for exchanging messages between the surface control system and the downhole equipment is selected. Messages between the surface control system and the downhole equipment are then exchanged using the second set of active wireless devices to control the downhole operation.

A method also is disclosed where an acoustic communications network of acoustic modems communicatively interconnecting equipment and a control system is established. The acoustic modems are deployed along a conduit. Acoustic signals are communicated to exchange messages between the control system and the equipment using a plurality of hops between the acoustic modems. In response to a change in a noise condition in the acoustic communications network, the number of hops used to communicate messages between the control system and the equipment are changed. Messages between the control system and the equipment then are exchanged using the changed number of hops.

A communication system for communicating with downhole components in a wellbore is disclosed. The system includes a control system to exchange messages with the downhole components to control performance of a downhole operation. A plurality of first wireless modems axially spaced along a tubing are deployed in the wellbore to transmit wireless signals to communicate the messages between the control system and the downhole components during performance of the downhole operation. The first wireless modems including repeater modems. A cluster of second wireless modems is positioned proximate a first location along the tubing and are communicatively coupled to the first wireless modems. The second wireless modems include a hub modem and a plurality of end nodes interfaced to a corresponding downhole component. The communication system also includes a network management system to adapt selection of particular repeater modems of the first wireless modems to communicate messages between the control system and the downhole components.

BRIEF DESCRIPTION OF THE DRAWINGS

Certain embodiments are described with reference to the accompanying drawings, wherein like reference numerals denote like elements. It should be understood, however, that the accompanying drawings illustrate the various implementations described herein and are not meant to limit the scope of various technologies described herein. The drawings show and describe various embodiments.

FIG. 3 is a schematic illustration of a downhole wireless communications system with a two-dimensional backbone architecture, in accordance with an embodiment.

FIG. 5 is flow diagram representation of a network management scheme, according to an embodiment.

DETAILED DESCRIPTION

Figure 1:
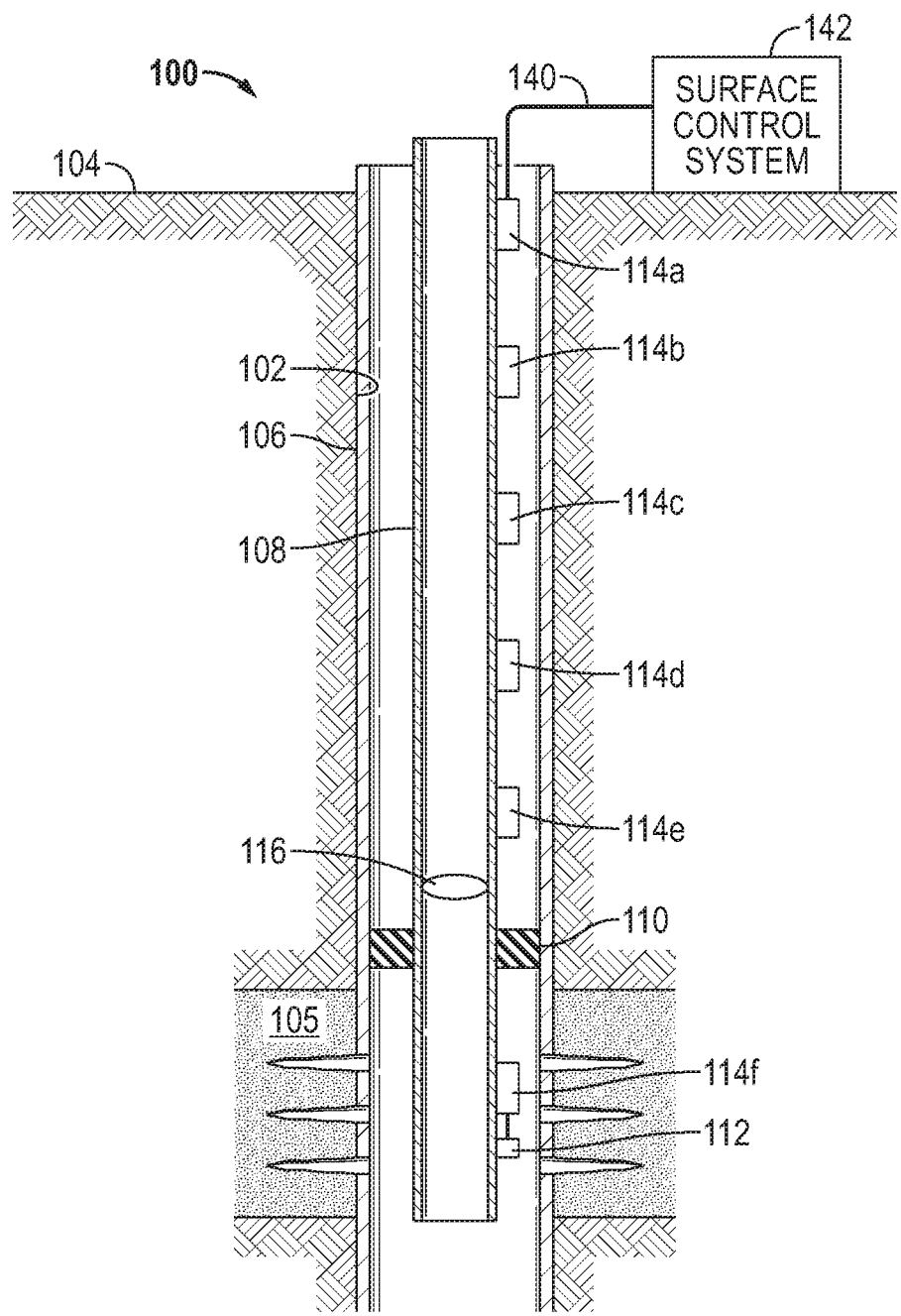
FIG. 1 is a schematic illustration of a downhole wireless communications system for controlling an operation, in accordance with an embodiment.

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with"

or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Communication systems for transmitting information between the surface and downhole components are faced with numerous challenges. As just one example, operations performed within downhole environments can introduce noise which can affect the quality of communications and, thus, the ability to reliably send and transmit messages in a wireless communication system. When the downhole environment is a hydrocarbon-producing well, noise levels can increase substantially due to the flow of the hydrocarbon production fluid. In general, provided that the Signal to Interference and Noise Ratio ("SINR") or Signal to Noise Ratio ("SNR") is sufficiently high, then messages can be reliably received and communicated. Likewise, when the SNR is too low, message quality can be degraded and difficulties encountered in reliably receiving a message.

One type of wireless communication system that can be deployed in a downhole environment is an acoustic communications system that uses an elastic medium as the communications path. An acoustic communications network is composed of an arrangement of acoustic modems that receive and transmit messages. In general, acoustic modems use a pipe string (or tubing) as the elastic transmission medium. The communication network is established by connecting a plurality of acoustic modems to tubing at axially spaced locations along the string. Each modem includes a transducer that can convert an electrical signal to an acoustic signal (or message) that is then communicated using the tubing as the transmission medium. An acoustic modem within range of a transmitting modem receives the acoustic message and processes it, including by demodulating and decoding the message.

A portion of the message will contain network information from which the receiving modem can determine whether the message is addressed to it or another modem. If the message is addressed for another device, then the receiving modem amplifies it and acoustically retransmits it along the tubing. This process repeats until the communication reaches its intended destination.

Two types of modems generally are deployed in an acoustic network. The first type of modem is one that is connected to an external tool at a fixed depth. This type of modem is referred to as an "Interfaced Modem" ("IM"). The second type of modem is used to repeat (or forward), as well as to amplify (or boost), an acoustic message. This second type of modem is referred to as a "Repeater Modem" ("RM").

The repeater modems are used to account for the fact that wireless communication signals between surface systems and devices located furthest from the surface generally lack the strength to reach their destination. In many downhole applications, acoustic signals can experience an attenuation of about 10 decibels/1000 feet. Accordingly, when acoustic noise is present in the environment, it can be substantial relative to the strength of the acoustic signal.

To account for SNR limitations, communications between the surface and a downhole component often are performed as a series of hops. This is accomplished by positioning RMs at axially spaced intervals (e.g., 1000 ft.) along the acoustic communications path (e.g., a tubing) so that the RMs can forward acoustic messages to the final IM. Because a communication system is designed to operate reliably indifferent types of noise conditions, the spacing between RMs often is configured to account for the worst case noise scenario.

Acoustic messages that are transmitted in downhole applications can include queries or commands that are sent from a surface system to one or more IMs. The surface system includes a surface modem that transmits the message to the addressed IM via a route of active modems that has been determined when the network was established (e.g., during a network discovery phase). In some systems, redundancies are built in so that more than one modem along the route can be capable of receiving a given message.

An active modem is a modem in a powered condition in which the modem can attempt to detect and receive an acoustic message. When a message is detected, the modem attempts to demodulate and decode it. A portion of the message will include network information so that, when demodulated and decoded, the receiving modem can determine whether the message is locally addressed to it. If so, the modem manages the message by either forwarding it or executing the command. If the message calls for retransmission of a message, such as forwarding a message to another modem along the route or responding to a command or query, then the modem will transmit a new message that has been encoded and modulated in an appropriate manner. The ability of the modem to reliably decode a received message is related to the SNR of the received signal. As mentioned above, the SNR can fluctuate substantially during an operation, particularly when flow of a production fluid is present. When the SNR is low, the modem may not be able to reliably decode a received message.

When a successfully transmitted message (e.g., the query or command) is finally received by the addressed IM, the IM will generate a response that is then transmitted back to the surface system. The time that it takes for a message to reach the IM and return a response is referred to as the round trip time. The round trip time is proportional to the number of hops that the message makes to accomplish a desired result (e.g., respond to a query or a command). A hop corresponds to the communication link between two modems. By way of example, to query a downhole sensor for telemetry information, an acoustic message is transmitted in the downlink direction from the surface system to the IM that is interfaced with the addressed sensor. The downlink path can include a number of RMs and, thus, hops. When the message reaches the addressed IM, a return message that contains the requested information from the sensor is transmitted in the uplink direction to the surface system. Because the round trip time is affected by the number of hops, network management of the methods used to route a message to its destination (and thus the number of hops) affects the throughput or efficiency of the communications system.

In some instances, the routing determined by the network management system may not be optimal due to the fact that the arrangement of modems in a network is configured to account for worse case noise conditions. That is, to ensure reliable communications under different noise scenarios, a message may take more hops than otherwise would be needed given the then-current noise condition. Depending on the network configuration and the depth of a well, these extra hops can result in a round trip time that is lengthy. By way of example, round trip times in downhole applications can extend from as little as 15 seconds to as much as 5 minutes or more depending (at least in part) on the number of hops. Because the number of messages conveyed over the network during an operation can be very large, the cumulative round trip time can contribute substantially to the amount of time it takes to complete an operation. As a result, unless effective network management techniques are in place, network efficiency and throughput can be severely diminished, particularly during periods of time when the SINR is high and messages otherwise could be more efficiently transmitted.

Network management also plays a role when the network initially is installed. For successful communications between modems, the transmitter of the sending modem and the receiver of the receiving modem to use the same modulation parameters (e.g., carrier frequency, modulation scheme, error correction, baud rate, etc.). Because the physics of acoustic propagation is complex, the modulation parameters needed for a hop often cannot be predetermined before installation. Thus, a network discovery phase is implemented to discover and optimize the modulation parameters. This phase can take a substantial amount of time, which translates to downtime for an operator. Depending on the discovery algorithm and the modulation schemes employed, the network discovery phase can last anywhere from 5 minutes to one hour or more.

Another aspect of network management is power management. Downhole modems typically are powered by batteries and are often in a powered active state so that they are available to detect messages and either act on them or pass them on. An effective power management scheme includes power savings features to minimize battery consumption so that the lifetime specification of the downhole application can be met.

A network management scheme therefore can be implemented that effectively manages the use of RMs in the network. Such management can increase the lifetime of the system through power management and can decrease the latency of the system by adaptively adjusting the number of hops in a round trip based on the monitored signal noise levels. Network architectures and network management techniques that can be employed in such architectures are described in further detail below.

Backbone Network Architecture

The choice of a particular network management scheme is dependent, in part, on the architecture of the network. In various embodiments, a backbone architecture which includes linear network portions and clusters lends itself to a network management scheme that can increase the throughput and efficiency of the network. To illustrate the efficiencies that can be gained with such an architecture, a linear network without clusters is illustrated in a deployment environment in FIG. 1 for comparison purposes.

FIG. 1 schematically illustrates a network 100 in which a plurality of acoustic modems are deployed. In FIG. 1, a wellbore 102 is drilled that extends from a surface 104 and through a hydrocarbon-bearing formation or other region of interest 105. Once the wellbore 102 is drilled, a casing 106 is lowered into the wellbore 102. Although a cased vertical well structure is shown, it should be understood that embodiments of the subject matter of this application are not limited to this illustrative example. Uncased, open hole, gravel packed, deviated, horizontal, multi-lateral, deep sea or terrestrial surface injection and/or production wells (among others) can incorporate a network of acoustic modems as will be described herein.

To test the formation, testing apparatus can be placed in the well in the proximity of the region of interest 105 so as to isolate sections of the well and to convey fluids from the region of interest to the surface. Typically, this is done using a jointed tubular drill pipe, drill string, production tubing, etc. (e.g., tubing 108) that extends from the surface equipment to the region of interest 105 in the wellbore 102.

A packer 110 can be positioned on the tubing 108 and can be actuated to seal the wellbore 102 around the tubing 108 at the region of interest. Various pieces of downhole test equipment are connected to the tubing 108 above or below the packer 110. Downhole equipment can include, for example, additional packers, valves, chokes, firing heads, perforators, samplers, pressure gauges, temperature sensors, flow meters, fluid analyzers, etc. In the embodiment shown, the downhole equipment includes a pressure sensor 112 located below the packer 110 and a valve 116 located above the packer 110.

In FIG. 1, a plurality of acoustic communication devices 114a-f (generally referred to herein as modems) are located along the tubing 108 in a linear arrangement. In some embodiments, the modems 114 can be mounted in a carrier which is attached to the tubing, although other mounting arrangements, including direct mounting connections, are possible and contemplated. A valve 116 is located above the packer 110, and modems 114a-e are located above the valve 116. The modem 114f is located below the packer 110 and the valve 116. In the example, the acoustic modem 114f is connected to downhole equipment 112 (e.g., a sensor) and operates to allow electrical signals from the downhole equipment 112 to be converted into acoustic signals for transmission to the surface 104 via the tubing 108 and the other modems 114a-e. The modems 114 also convert acoustic control signals transmitted from the surface 104 via the tubing 108 to electrical signals for operating downhole equipment, such as the downhole equipment 112, the valve 116, etc., in order to control the performance of a downhole operation. The signals transmitted between the acoustic modems 114 and the surface 104 can encompass control signals, commands, polls for data, data regarding tool status, data indicative of parameters monitored by sensors, etc., and can be transmitted between the modems 114 and the downhole equipment 112 as either digital or analog signals.

Figure 2:
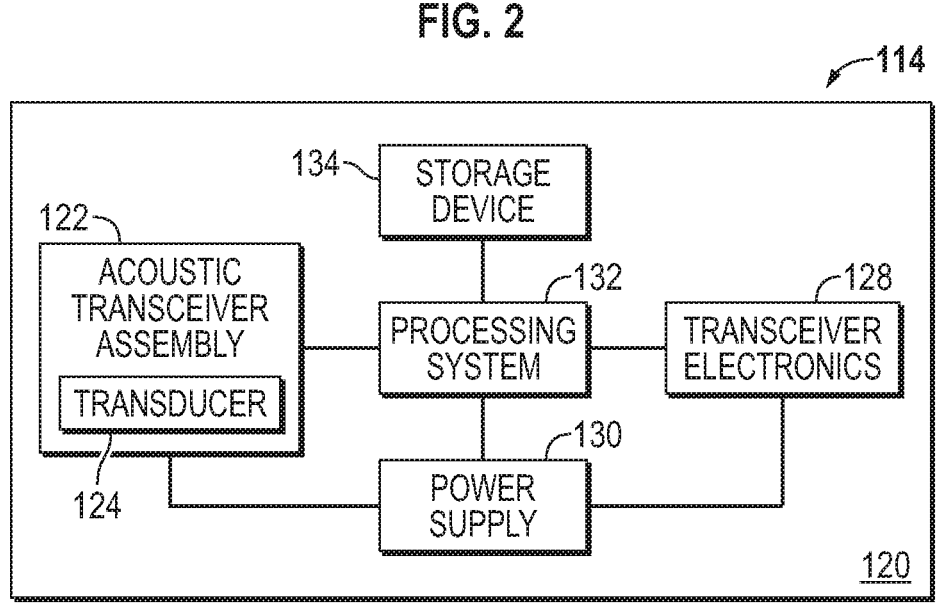
FIG. 2 is a schematic illustration of an acoustic modem that can be deployed in a downhole wireless communications system, in accordance with an embodiment.

A schematic illustration of a modem 114 is shown in FIG. 2. Modem 114 includes a housing 120 that supports an acoustic transceiver assembly 122 that includes electronics and a transducer 124 which can be driven to create an acoustic signal in the tubing 108 and/or excited by an acoustic signal received from the tubing 108 to generate an electrical signal. The transducer 124 can include, for example, a piezoelectric stack, a magneto restrictive element, and or an accelerometer or any other element or combination of elements that are suitable for converting an acoustic signal to an electrical signal and/or converting an electrical signal to an acoustic signal. The modem 114 also includes transceiver electronics 128 for transmitting and receiving electrical signals. Power can be provided by a power supply 130, such as a lithium battery, although other types of power supplies are possible.

The transceiver electronics 128 are arranged to receive an electrical signal from a sensor that is part of the downhole equipment 112. The electrical signal can be in the form of a digital signal that is provided to a processing system 132, which can encode and modulate the signal in a known manner, amplify the modulated signal as needed, and transmit the encoded, modulated and amplified signal to the transceiver assembly 122. The transceiver assembly 122 generates a corresponding acoustic signal for transmission via the tubing 108. The transceiver assembly 122 of the modem 114 also is configured to receive an acoustic signal transmitted along the tubing 108, such as by another modem 114. The transceiver assembly 122 converts the acoustic signal into an electric signal. The electric signal then can be passed on to processing system 132. In various embodiments, the processing system 132 can include, for example, a signal conditioner, filter, analog-to-digital converter, demodulator, modulator, amplifier, encoder, decoder, microcontroller, programmable gate array, etc. The modem 114 can also include a memory or storage device 134 to store data received from the downhole equipment so that it can be transmitted or retrieved from the modem 114 at a later time, as well as network management information which will be discussed in further detail below. Yet further, the memory or storage device 134 can store instructions of software for execution by the processing system 132 to perform the various modulation, demodulation, encoding, decoding, network management, etc. processes described herein.

Thus, a modem 114 can operate to transmit acoustic data from the downhole equipment 112 along the tubing 108. The modem 114 can also operate to receive acoustic control signals to be applied to the downhole equipment 112.

Returning to FIG. 1, to propagate an acoustic signal along the tubing 108 between, for instance, the modem 114$f$ and the surface, a series of modems 114$a$-$e$ are axially spaced along the tubing 108. In this arrangement the modem 114$e$ operates to receive an acoustic signal generated in the tubing 108 by the modem 114$f$ and to amplify and retransmit the signal for further propagation along the tubing 108. The number and spacing of the acoustic modems 114$a$-$f$ will depend on the particular installation. For instance when implemented in a well, the spacing between modems 114$a$-$f$ will be selected to accommodate particular testing tool configurations and will further depend on the presence and type of fluid in the well, the characteristics of the tubing 108 to which the modems 114$a$-$f$ are coupled, the configuration and power of the transceiver assembly 122, as well as other parameters that affect the operable range of modems 114$a$-$f$. When a modem 114 is operating as a repeater, the acoustic signal can be received, converted to an electrical signal, processed, amplified, converted to an acoustic signal and retransmitted along the tubing 108. In some embodiments, a modem 114 can simply detect the incoming acoustic signal, amplify it (including the noise) and transmit the amplified acoustic signal. In such embodiments, the modem 114 effectively is acting as a signal booster. But, in either case, communications between the surface and the downhole modems 114 is effectuated as a series of short hops, where each hop corresponds to the communications link between a transmitting modem and a receiving modem.

The acoustic modems 114$a$-$f$ can be configured to listen continuously for incoming acoustic signals or can listen periodically. An acoustic signal transmitted by a modem 114 is broadcast and is bi-directional. Thus, multiple modems 114$a$-$f$ can receive a particular signal and not just the modem 114 immediately adjacent the transmitting modem. As such, the acoustic signal (or message) typically includes address information so that a receiving modem 114 can determine both the source and the destination of the message and process and/or forward and/or ignore the message as may be appropriate.

Referring still to FIG. 1, the modem 114$a$ is located closest to the surface 104 and is coupled via a data cable or a wireless connection 140 to a surface control system 142 that can receive, store, process, and/or interpret data from the downhole equipment (e.g., sensor 112) and provide control signals for operation of the downhole equipment (e.g., valve 116).

While the embodiment in FIG. 1 is shown as a completed well, it should be understood that any of the networks and network management techniques described herein can be deployed in other environments or, when in a well, can be implemented in other stages of the life of the well. For instance, the systems and techniques described herein can be implemented during downhole operations performed during drilling, logging, drill stem testing, fracturing, stimulation, completion, cementing, production and even after the well has been shut in.

Although the modem 114$f$ in this example is communicatively coupled with downhole equipment 112 and the modem 114$e$ is communicatively coupled with the valve 116, it should be understood that any one or all of the modems 114$a$-$f$ can be interfaced modems that are communicatively coupled with different downhole components, such as other valves (including test valves, circulation valves, etc.), other sensors (including temperature sensors, pressure gauges, flow meters, fluid analyzers, etc.), and any other downhole tools used in the performance of a downhole operation (including packers, chokes, firing heads, tubing conveyed perforator gun drop subs, etc.).

To avoid interference between messages addressed to different interfaced modems, one message propagates through the network at a time. Thus, messages exchanged between the surface and both interfaced modem 114$f$ and interfaced modem 114$e$ will take two round trips on the communications network. That is, a message sent to interfaced modem 114$e$ cannot be transmitted until a responsive message is received back from interfaced modem 114$f$, and vice versa. The need for multiple lengthy round trips to query or send commands to different IMs affects the efficiency of the communications network.

FIG. 3 schematically illustrates a backbone architecture for a communications network that can reduce the number of round trips needed to communicate with multiple interfaced modems. In FIG. 3, the network 200 includes two linear portions 202, 204 and two clusters 206, 208. Linear portion 202 includes RMs 210, 212, and 214 arranged in a series that are communication with a hub modem 216 that, in turn, is in communication with modems in cluster 206. Linear portion 204 includes RMs 218 and 220. RM 218 communicatively interconnects hub modem 216 to RM 220, and RM 220 is communicatively coupled to a hub modem 222 of cluster 208.

Each cluster 206, 208 includes a plurality of interfaced modems, which, in this embodiment, are end nodes of their respective clusters. An end node is a modem that does not repeat received messages. An end node appropriately acts on and responds to messages that are addressed to that end node, but does not repeat messages that are addressed to other nodes. Cluster 206 includes IMs 224, 226, 228 and 230 communicatively coupled to hub modem 216. Cluster 208 includes IMs 232, 234, and 236 communicatively coupled to hub modem 222. In the embodiment shown in FIG. 3, the end nodes in each cluster are generally located at the same fixed depth in the wellbore. Further the communication paths between the end nodes and their respective hub nodes are bi-directional, half-duplex acoustic communication paths. Similarly, the communication paths between the hub nodes and the repeaters modems are bi-directional, half-duplex acoustic paths. To avoid interference, messages can be transmitted in one direction at a time on any half-duplex communication path.

In the embodiment shown, each modem in the linear portions 202, 204 of the network 200 has the ability to communicate with the adjacent modems in the linear portions 202, 204 of the network. In other embodiments, redundant repeater modems may also be included in the network 200. For instance, when repeater modems are used, each repeater modem can communicate with its neighbor modem and with its neighbor's neighbor modem in both the uplink and downlink directions for a first order of redundancy, but the subject matter described herein is not limited in this manner. Other configurations of repeater modems also can be used.

In FIG. 3, the hub modems 216 and 222 also are considered repeater modems. Each of hubs 216 and 222 can communicate with its uplink and downlink neighbors in the linear portions 202, 204 of the network 200, as well as with their respective end nodes. Although not shown in FIG. 3, each of the end (or interfaced) nodes 224-236 are interfaced with external tools, sensors or other downhole components.

Acoustic communications between a hub 216, 222 and the end nodes in their respective clusters 206, 208 can be accomplished in a variety of manners. In one embodiment, each of hubs 216 and 222 can communicate with their respective nodes one by one. For example, hub 216 can transmit a message to IM 224 and wait to receive a response before transmitting a message to IM 226, and so forth. In another communication arrangement, hub 216 can broadcast a message to all nodes in cluster 206. The IMs 224, 226, 228, 230 can then respond in accordance with a communication protocol where one of the IMs transmits a response at a time. For example, the IMs 224-230 can be synchronized or controlled so that the IMs do not attempt to communicate at the same time. Any of a variety of known types of communication protocols for ensuring synchronous communications in this manner are possible and contemplated. Regardless of the protocol, the hub 216 in any of these examples then can collect the responses received from the IMs 224, 226, 228 and 230 and transmit a single consolidated message back to the surface system.

Configuring the wireless communication network with a backbone architecture that includes linear portions and clusters can offer an improvement in terms of network efficiency and throughput. Consider, for example, a scenario where the surface system would like to obtain information from downhole tools or sensors in cluster 208. To gather the information, the surface system would need to transmit three messages addressed to each of IMs 232, 234 and 236. Three round trips would be needed to collect the information, with each round trip including a downlink path where the message is received and retransmitted by RMs 210, 212 and 214, hub 216, RMs 218 and 220, and hub 222; and an uplink path where the return message is received and retransmitted by the same seven modems. By using clustering in a backbone architecture, a single query for information can be sent by the surface system that is addressed to the hub node 222 associated with the cluster 208. The hub node 222 can then communicate with the end nodes 232, 234, 236, all of which are its neighbors. The hub node 222 can consolidate the responses received from the end nodes and send a single return message to the surface system 201. This arrangement thus reduces the three round trips across linear portions 202, 204 to a single round trip (with single hop side trips between the hub node 222 and the end nodes), a substantial improvement in network throughput.

Further, the network architecture shown in FIG. 3 can also provide for power efficiencies. Because the end nodes 224-236 in the clusters 206 and 208 are not used as repeaters in the network, a network management scheme can be implemented which selectively powers down (or hibernates) the end nodes 224-236 when no action by or information from an end node will be desired for a period of time.

Although a network with two linear portions and two clusters is shown in FIG. 3, it should be understood that the network could have fewer or more linear portions or fewer or more clusters and still achieve the benefits discussed above.

Bypassing Nodes

Further efficiencies can be obtained with the backbone architecture shown in FIG. 3 when the network management scheme is configured to adapt message routing by selectively bypassing nodes in the network. As noted previously, the acoustic noise level experienced by a downhole communications network can fluctuate widely during a downhole operation. During periods of production fluid flow, the noise level can increase by as much as 50 decibels. Over a constant distance, the attenuation of the acoustic signal remains constant (e.g., from 5 to 30 decibels/1000 feet, depending on the carrier frequency and the physical parameters of the well). Thus, during time periods in which fluid flow is occurring, the SINR between two communicating modems is decreased to 50 decibels. As a consequence, the distance between communicating modems could be increased by at least 2000 feet during a quiet period compared to a flow period. If noise during a flow period would call for a modem separation of 1000 feet to ensure reliable communications, then during a quiet period messages could be reliably communicated over distances of at least 3000 feet. This represents a substantial reduction of the number of repeaters that would be needed to maintain reliable communications, which would reduce the number of hops, which in turn would improve the throughput of the network.

With this in mind, an embodiment described herein implements a network management scheme that includes the ability to selectively bypass modems based on noise conditions in the network. Thus, for instance, if one or more modems detects a high SNR (or otherwise determines that signal quality is good), the network management scheme can push certain of the modems into a standby mode in which the modems do not participate (at least temporarily) in the reception and transmission of messages. Such a network management scheme is not limited to use with the backbone architecture in FIG. 3, but also can be used in conjunction with other network architectures, including a linear architecture.

Figure 4A:
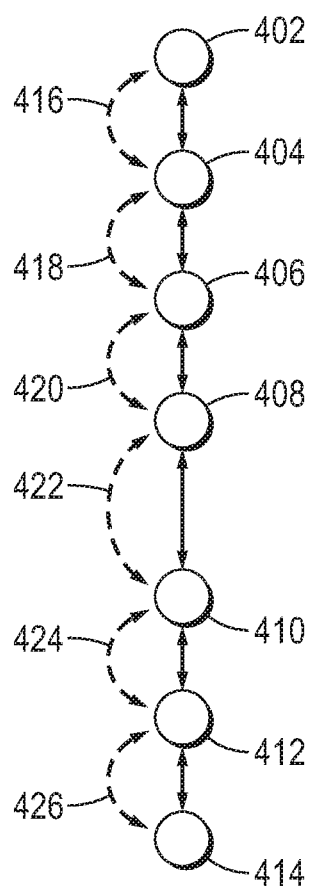
FIGS. 4A and 4B are schematic representations of a selective bypass network management scheme, according to an embodiment.
Figure 4B:
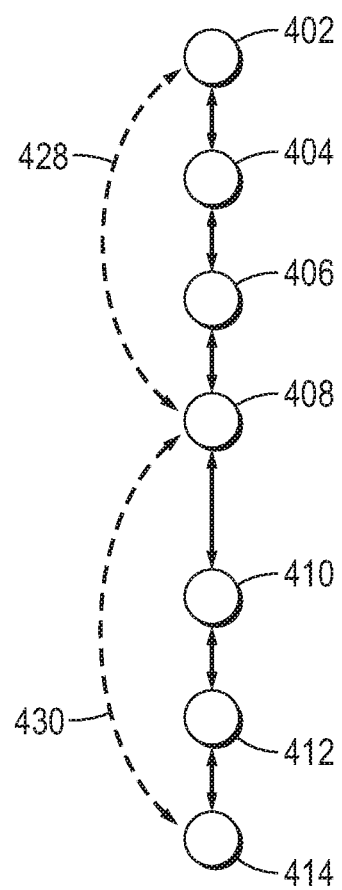

A schematic representation of a selective bypass network management scheme that adapts to noise conditions is described with reference to FIGS. 4A and 4B. FIG. 4A represents a linear network 400 which has been initialized with all of the nodes 402-414 active. In this example, a message takes six hops 416, 418, 420, 422, 424, 426 to reach the bottom of the network from the top. In FIG. 4B, the network management scheme has been implemented in the linear network 400 and has resulted in de-selecting modems 404, 406, 410 and 412. As a result, the same message takes two hops 428, 430 to reach the bottom of the network from the top.

A network management scheme that selectively bypasses modems can be implemented in a variety of manners. In an embodiment, each modem can be configured to monitor the noise condition on the acoustic path or a portion of the acoustic path. For example, the noise condition can be monitored by monitoring or tracking the quality of the acoustic signals the modem receives from other modems. Quality can be determined based on whether a message was successfully received, demodulated and decoded, and the modem can be configured to maintain or store a record of successful and unsuccessful receipts. For example, the signal quality of the wireless signal that is carrying a message can be quantified by calculating the errors on the constellation map. The error is the difference between the demodulated symbols with the ideal position of the symbol. Those errors can be averaged to give an indicator of the quality of the wireless communication link. Other criteria that provide an indication of signal quality can also be used, such as signal amplitude versus noise amplitude, synchronization coefficients, distortion evaluation, and so forth. The stored record could include other information that could be used to correlate the signal quality to certain events or network conditions, such as performance of a particular downhole operation, flow of a production fluid, and so forth. Thus, for example, the record could include an identification of the transmitting device, a time stamp, identification of a command or query included in the message, etc.

In some embodiments, the quality information can be used by the network itself in an adaptive manner. That is, the quality information is used by the modems in the network so that the modems can adaptively select/de-select which nodes should be part of the network at any given period of time. Or the quality information can be used by a subset of one or more nodes in the network that have been assigned responsibility for managing route selection for the network. As an example, those nodes which have been assigned management responsibility may monitor (or track) and store information that corresponds to the noise of the communication path, and these nodes can then use the monitored information in their network management decisions. Or, all nodes in the network may monitor noise conditions or signal quality and then can transmit the monitored information to the managing nodes either periodically or in response to a command. The managing node(s) then use the noise/signal quality information to determine selection of nodes in the network. As an example, if the signal quality information indicates a quiet period (e.g., the noise level is low, the SNR is high, or the number of successfully received messages is large), then the managing node(s) may send a message that pushes selected active nodes into a standby state. In the standby state, a node is powered, but does not attempt to receive and decode messages. Similarly, if the noise information indicates that the noise condition has increased (e.g., the noise level is high, the SINR is low, the number of messages that are not successfully received has increased), then the managing node(s) may send a message that activates selected nodes that had been on standby.

In other embodiments, the monitored information can be provided to the network operator by transmitting it to the surface system. For example, the surface system can be configured to transmit a message to the network modems that includes a query for the tracking information. The modems that have maintained noise or signal quality information can respond to the query with a return message that is transmitted to the surface system. As another example, stored signal quality or noise information can be transmitted to a surface system periodically. Yet further, the noise-related information can be included along with the other information that the modem transmits to the surface system in response to any received message.

When received at the surface, the operator can access the tracking information and use it to guide decisions regarding which modems can be bypassed or which modems should be selected. The decision regarding the modem selections can be made in real-time based on then-present noise conditions on the communications path or a portion(s) of the path. Or, the decision can be based on historical information where modems are selected based on accumulated knowledge of noise conditions that are generated during particular operations. Thus, an operator can make modem selections that are appropriate for a particular operation that is in process, a particular operation that is planned, an expectation of a quiet period, and so forth. A command with the modem selections can then be transmitted to the network so that the modems can update the network configuration and route subsequent messages accordingly.

An example of a scheme for selectively bypassing modems is shown in the flow diagram of FIG. 5. In block 502, a communications network is established so that a communications route between the surface and a downhole component includes a first set of acoustic modems that are in an active state in which they participate in transmitting messages between the surface and a downhole component to control or monitor an operation. While messages are exchanged between the surface and the downhole component, the noise conditions associated with the communications network are monitored, such as by monitoring the SNR (block 504). Based on the monitored information, a different communications route can be established that includes a second set of activated modems (block 506). This different route can be established while the operation is ongoing. The second set can include fewer, more or different active modems than the first set. Messages can then be exchanged between the surface and a downhole component using the second set of active modems.

Modem Hibernation

In some embodiments, the network management scheme can be configured to select modems which can be placed into a hibernation mode for a given period of time. Hibernation can be achieved, for example, by transmitting a message to a targeted modem that includes a hibernation command. In embodiments, the hibernation command can specify a duration of a sleep period in which the modem is not powered. Rather than, or in addition to a sleep period, the hibernation command can specify a wake up time. As examples, the wake up time could be based on occurrence of a triggering event or could be synchronized to a system clock.

The ability to hibernate modems can be useful in various different circumstances. For example, modems that are end nodes in clusters (e.g., IMs 224-236 in FIG. 3) can be hibernated during any periods of time in which the modems will not be used to communicate with their interfaced component. By way of illustration, an end node in a cluster can be connected to a trigger that is used at the end of an operation. Thus, a modem that is an end node can be hibernated until the end of the operation. Such a modem could be equipped with a smaller battery than other modems since they are subjected to occasional use.

In another example, the hibernation technique can be used in conjunction with the modem bypass technique described above. In this implementation, a modem can be hibernated if it is determined that the modem can be temporarily bypassed in the network because the SINR or other signal quality indicator is sufficiently high. For instance, the network command that is transmitted to the modems to selectively de-activate them from the network can also include a hibernate command.

Decentralized Network Management

The network management techniques described above can be implemented in a distributed or decentralized manner. In a distributed embodiment, each modem in the acoustic network can be configured to monitor and track acoustic noise levels and to use the monitored information to adaptively select the next modem in the network so that the message is routed to its ultimate destination or destinations.

Decentralization of routing determinations also can be leveraged to more efficiently route queries that seek responses from multiple modems. To illustrate, consider a distributed measure of temperature in a downhole environment. To obtain the measurement, a temperature sensor is interfaced with each of a plurality of target wireless modems. If ten sensors are deployed, then the control system would need to transmit ten messages with queries for the temperature measurement, where each of the ten messages is addressed to one of the ten interfaced modems.

By decentralizing or distributing network management amongst the various modems, the transmission of ten separate messages can be avoided. For example, the control system can transmit a message with a query directed to all ten interfaced modems. As each modem receives the message, each modem can determine how to forward the message to ensure that it ultimately reaches all of the interfaced modems. In this manner, the number of round trips in this example can be reduced from ten to one, which represents a substantial increase in throughput and efficiency.

In the foregoing description, data and instructions are stored in respective storage devices (such as, but not limited to, storage device 134 in FIG. 2 or a storage device associated with the surface control system 142 in FIG. 3) which are implemented as one or more non-transitory computer-readable or machine-readable storage media. The storage devices can include different forms of memory including semiconductor memory devices; magnetic disks such as fixed, floppy and removable disks; other magnetic media including tape; optical media such as compact disks (CDs) or digital video disks (DVDs); ROM, RAM, or other types of internal storage devices or external storage devices. The stored data can include the records of the monitored noise information. The stored instructions can correspond to the network management schemes described herein and can be executed by a suitable processing device, such as, but not limited to, the processor 132 in FIG. 2 or a processing system associated with the surface control system in FIG. 3. The processing device can be implemented as a general purpose processor, a special purpose processor, a microprocessor, a microcontroller, and so forth, and can be one processor or multiple processors that execute instructions simultaneously, serially, or otherwise.

Although the embodiments have been discussed above with reference to acoustic modems, it should be understood that the network management techniques and arrangements disclosed herein are not limited to acoustic applications, but are applicable in other wireless contexts, such as modems that communicate via a radio frequency (RF) link, inductive coupling, etc. In addition, the network management techniques can be applied in a variety of network configurations and are not limited to a simple series of repeaters or to the cluster arrangements discussed in the embodiments. For instance, the modems in the network can be located so that multiple modems are within communication range of other modems. Thus, the network may include redundant communication paths so that failure of any one modem is not a single point of failure. The techniques and arrangements discussed herein also are not limited to use in a wellbore, but can be applied with any network of wireless devices where an efficient network management scheme is desired.

Although the preceding description has been described herein with reference to particular means, materials and embodiments, it is not intended to be limited to the particulars disclosed here; rather, it extends to all functionally equivalent structures, methods and uses, such as are within the scope of the appended claims.

What is claimed is:

1. A method of communicating with downhole equipment in a borehole, comprising:
    communicating wireless signals to exchange messages between a surface control system and downhole equipment to control performance of a downhole operation, wherein the messages are exchanged using a first set of active wireless devices provided along a tubing in the borehole;
    monitoring an indicator of quality of the wireless signals on the first wireless communications path;
    selecting, based on the monitored quality indicator, a second set of active wireless devices for exchanging messages between the surface control system and the downhole equipment; and
    exchanging messages between the surface control system and the downhole equipment using the second set of active wireless devices to control the downhole operation,
    wherein selecting the second set of active wireless devices comprises transmitting a message to add selected wireless devices to the first set of active wireless devices.

2. The method as recited in claim 1, further comprising transmitting the monitored quality indicator information to the surface system; and based on the monitored quality indicator information, transmitting, from the surface control system, a message to select the second set of active wireless devices.

3. The method as recited in claim 1, further comprising transmitting a message to place selected wireless devices in the first set of active wireless devices in a hibernation state upon completion of the operation.

4. The method as recited in claim 1, where the wireless communications path is an acoustic communications path.

5. A method of communicating with downhole equipment in a borehole, comprising:
    communicating wireless signals to exchange messages between a surface control system and downhole equipment to control performance of a downhole operation, wherein the messages are exchanged using a first set of active wireless devices provided along a tubing in the borehole;
    monitoring an indicator of quality of the wireless signals on the first wireless communications path;
    selecting, based on the monitored quality indicator, a second set of active wireless devices for exchanging messages between the surface control system and the downhole equipment; and
    exchanging messages between the surface control system and the downhole equipment using the second set of active wireless devices to control the downhole operation,
    wherein the second set of active wireless devices is a subset of the first set of active wireless devices, and wherein selecting the second set comprises transmitting a message to place selected wireless devices in the first set of active wireless devices in a standby mode.

6. A method, comprising:
establishing an acoustic communications network of acoustic modems communicatively interconnecting equipment and a control system, the acoustic modems deployed along a conduit, wherein the equipment is located in a wellbore that penetrates an earth surface;
communicating acoustic signals to exchange messages between the control system and the equipment using a plurality of hops between the acoustic modems;
performing a downhole operation in the wellbore while communicating the messages between the equipment and the control system;
in response to a change in a noise condition in the acoustic communications network, changing the number of hops used to communicate messages between the control system and the equipment, wherein the number of hops are changed during performance of the downhole operation; and
continuing to perform the downhole operation while communicating messages between the control system and the equipment using the changed number of hops.

7. The method as recited in claim 6, further comprising monitoring the noise condition, wherein the number of hops is increased if the monitoring indicates an increased noise level; and
wherein the number of hops is decreased if the monitoring indicates an improved noise level.

8. The method as recited in claim 6, further comprising:
monitoring the noise condition;
communicating a message to the control system that includes signal quality information indicative of the monitored noise condition; and
based on the signal quality information, transmitting a message from the control system to select acoustic modems to use in communicating messages between the control system and the equipment.

9. The method as recited in claim 8, wherein the transmitted message places the selected acoustic modems in a standby mode.

10. The method as recited in claim 8, wherein the control system is located at the earth surface.

11. The method as recited in claim 6, further comprising transmitting a message to place selected acoustic modems in a hibernation state upon completion of the downhole operation.

12. A communication system for communicating with downhole components in a wellbore, comprising:
a control system to exchange messages with the downhole components to control performance of a downhole operation;
a plurality of first wireless modems axially spaced along a tubing deployed in the wellbore to transmit wireless signals to communicate the messages between the control system and the downhole components during performance of the downhole operation, the first wireless modems including repeater modems;
a cluster of second wireless modems positioned proximate a first location along the tubing and communicatively coupled to the first wireless modems, the second wireless modems including a hub modem and a plurality of end nodes interfaced to a corresponding downhole component; and
a network management system to adapt selection of particular repeater modems of the first wireless modems to communicate messages between the control system and the downhole components, wherein the network management system adapts selection by instructing particular repeater modems of the first wireless modems to either enter or exit a standby state.

13. The system as recited in claim 12, wherein the network management system adapts selection of particular repeater modems based on a wireless signal quality indicator.

14. The system as recited in claim 12, wherein the control system and the network management system are located at a surface of the wellbore.

15. The system as recited in claim 12, wherein the hub modem is configured to broadcast a message received from the control system to the end nodes.

16. The system as recited in claim 12, wherein the hub modem is configured to consolidate responses received from the end nodes into a response message, and to transmit the response message to the control system.

17. The system as recited in claim 12, wherein the control system and the network management system are located at a surface of the wellbore.

18. The system as recited in claim 12, wherein the network management system is distributed across the first wireless modems.

* * * * *